(12) United States Patent
Koba

(10) Patent No.: US 6,222,947 B1
(45) Date of Patent: *Apr. 24, 2001

(54) IMAGE EDITING APPARATUS AND METHOD AND MEDIUM ON WHICH PROGRAMS ARE RECORDED

(75) Inventor: Toshinori Koba, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/025,416

(22) Filed: Feb. 18, 1998

(30) Foreign Application Priority Data

Feb. 19, 1997 (JP) .................................................. 9-035119

(51) Int. Cl.$^7$ ....................................................... G06K 9/36
(52) U.S. Cl. .......................... 382/284; 382/294; 358/302; 358/452; 707/517
(58) Field of Search ................................... 382/284, 165, 382/296, 294, 305; 358/302, 527, 537, 452; 348/231; 707/505, 517, 518; 345/342, 346, 433

(56) References Cited

U.S. PATENT DOCUMENTS

| | | | |
|---|---|---|---|
| 4,888,648 | * 12/1989 | Takeuchi et al. | 358/335 |
| 4,949,287 | * 8/1990 | Yamaguchi et al. | 364/523 |
| 5,021,989 | * 6/1991 | Fujisawa et al. | 364/900 |
| 5,379,373 | * 1/1995 | Hayashi et al. | 395/148 |
| 5,434,683 | * 7/1995 | Sekine et al. | 358/520 |
| 5,566,004 | * 10/1996 | Imaizumi et al. | 358/450 |
| 5,751,829 | * 5/1998 | Ringland et al. | 382/100 |
| 5,795,090 | * 8/1998 | Jackson | 402/79 |
| 5,796,428 | * 8/1998 | Matsumoto et al. | 348/231 |

* cited by examiner

Primary Examiner—Jose L. Couso
Assistant Examiner—Kanji Patel
(74) Attorney, Agent, or Firm—Fitzpatrick, Cella, Harper & Scinto

(57) ABSTRACT

An image editing apparatus for laying out a plurality of images input from an image input unit to a plurality of pages includes an input unit for inputting the number of images to be laid out on one page, a determination unit for determining images to be laid out on each page in accordance with the number input from the input unit and the number of input images, and a layout unit for laying out the images to each page in accordance with the determination made by the determination result.

105 Claims, 8 Drawing Sheets

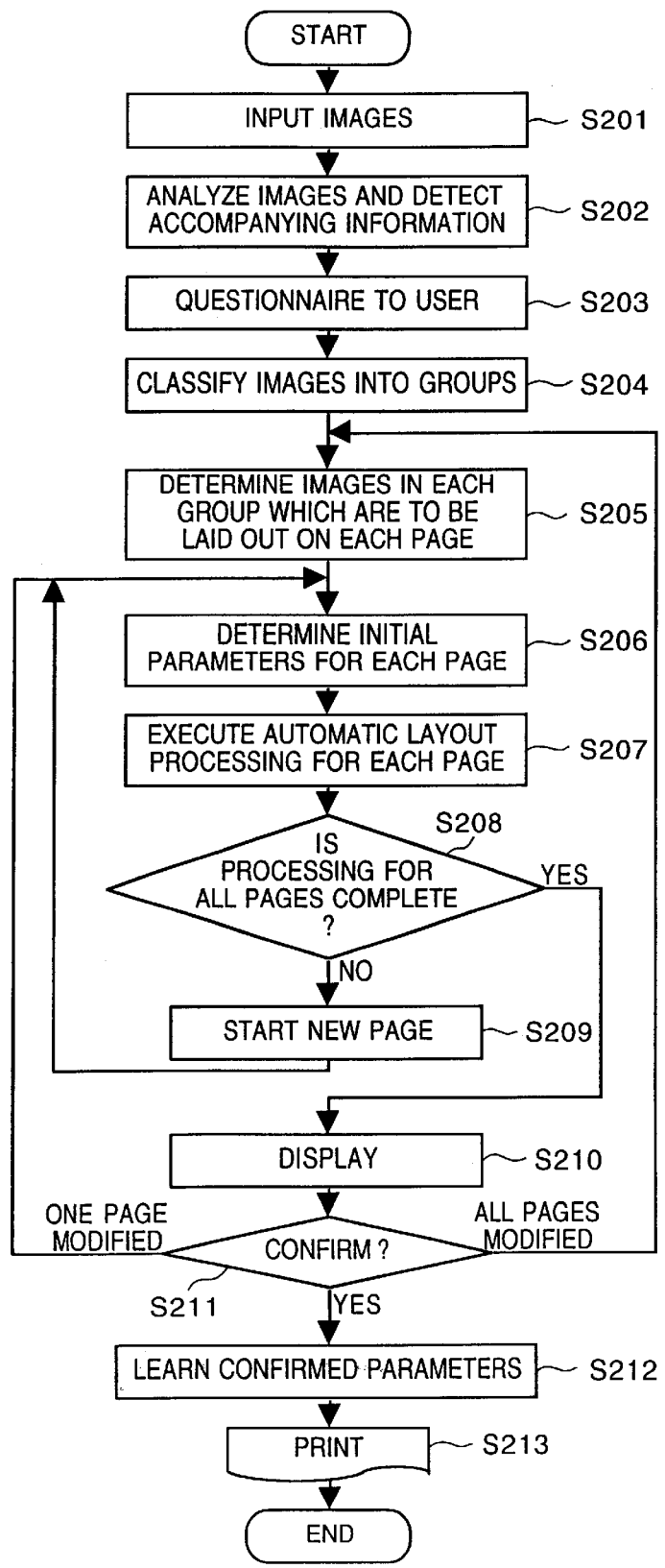

IMAGE EDITING APPARATUS AND METHOD AND MEDIUM ON WHICH PROGRAMS ARE RECORDED

BACKGROUND OF THE INVENTION

The present invention relates to an image editing apparatus for laying out digital images in a desired form and outputting the layout result.

Electronic album systems have been proposed. These systems are designed to lay out digital images on a virtual sheet in a computer and display the resultant sheet image on a CRT or output it on a cardboard by using a color printer or the like.

In general, in such a system, images are modified and arranged manually and intuitively as in the case of photographic prints being pasted on an album cardboard. Recently, an automatic layout function of automatically modifying and arranging images has been used to facilitate such operations.

A method of avoiding uniform layouts has also been proposed. As a means for implementing an automatic layout function, many patterns in which arrangement and modification parameters and the like are set in advance, i.e., layout templates, are prepared. The operator arbitrarily selects a desired pattern from these patterns to obtain a layout reflecting the user's preference and avoid uniform layouts.

Assume that a plurality of images are to be laid out throughout a plurality of pages by using this automatic layout function. In this case, it takes time and effort to determine the images to be laid out in units of pages and manually set the template to be used for each page.

If, however, a single layout pattern is used for all the pages, an attractive layout result cannot be obtained.

In a method of randomly setting layout patterns for the respective pages, the overall arrangement of an album is excessively complicated in consideration of the delimitation of events and pages. More specifically, when, for example, 10 images associated with an event A and 14 images associated with an event B are to be continuously laid out on a plurality of pages, the 10th and 11th images are preferably laid out on different pages. In the method of randomly setting layout patterns for the respective pages, a problem is posed in this point.

SUMMARY OF THE INVENTION

The present invention has been made in consideration of the above situation, and has as its object to provide an image editing apparatus such as an electronic album system in which when a plurality of images input from an image input means are to be laid out on a plurality of pages, the images to be laid out on each page can be automatically set without requiring a cumbersome operation of setting various parameters for each page, and a variety of layouts can be obtained.

It is another object of the present invention to provide an image editing apparatus which can proportionally assign images to each page.

According to the present invention, there is provided an image editing apparatus for laying out a plurality of images input from image input means to a plurality of pages, comprising input means for inputting the number of images to be laid out on one page, determination means for determining images to be laid out on each page in accordance with the number input from the input means and the number of the plurality of images, and layout means for laying out the images to each page in accordance with the determination made by the determination result.

In addition, according to the present invention, there is provided an image editing apparatus for laying out a plurality of images input from image input means to a plurality of pages, comprising input means for inputting the number of images to be laid out on one page, grouping means for classifying the plurality of images into groups, determination means for determining images to be laid out on each page in accordance with the number input from the input means and the number of images in each of the groups, and layout means for laying out the images to each page in accordance with the determination made by the determination means.

Furthermore, according to the present invention, there is provided an image editing apparatus for laying out a plurality of images input from image input means to a plurality of pages, comprising determination means for determining images to be laid out on each page in accordance with caption information input by a user upon photographing each of the images, and layout means for laying out the images on each page in accordance with the determination made by the determination means.

Moreover, according to the present invention, there is provided an image editing apparatus for laying out a plurality of images input from image input means to a plurality of pages, comprising analysis means for analyzing each of the images, determination means for determining images to be laid out on each page in accordance with the analysis result obtained by the analysis means, and layout means for laying out the images on each page in accordance with the determination made by the determination means.

Other objects, features, and advantages of the present invention will become clear from the description thereof in the following specification and the accompanying drawings.

BRIEF DESCRIPTION OF THE DRAWINGS

FIG. 4 is a flow chart showing the operation of the third embodiment;

DETAILED DESCRIPTION OF THE PREFERRED EMBODIMENT (First Embodiment)

Figure 1:
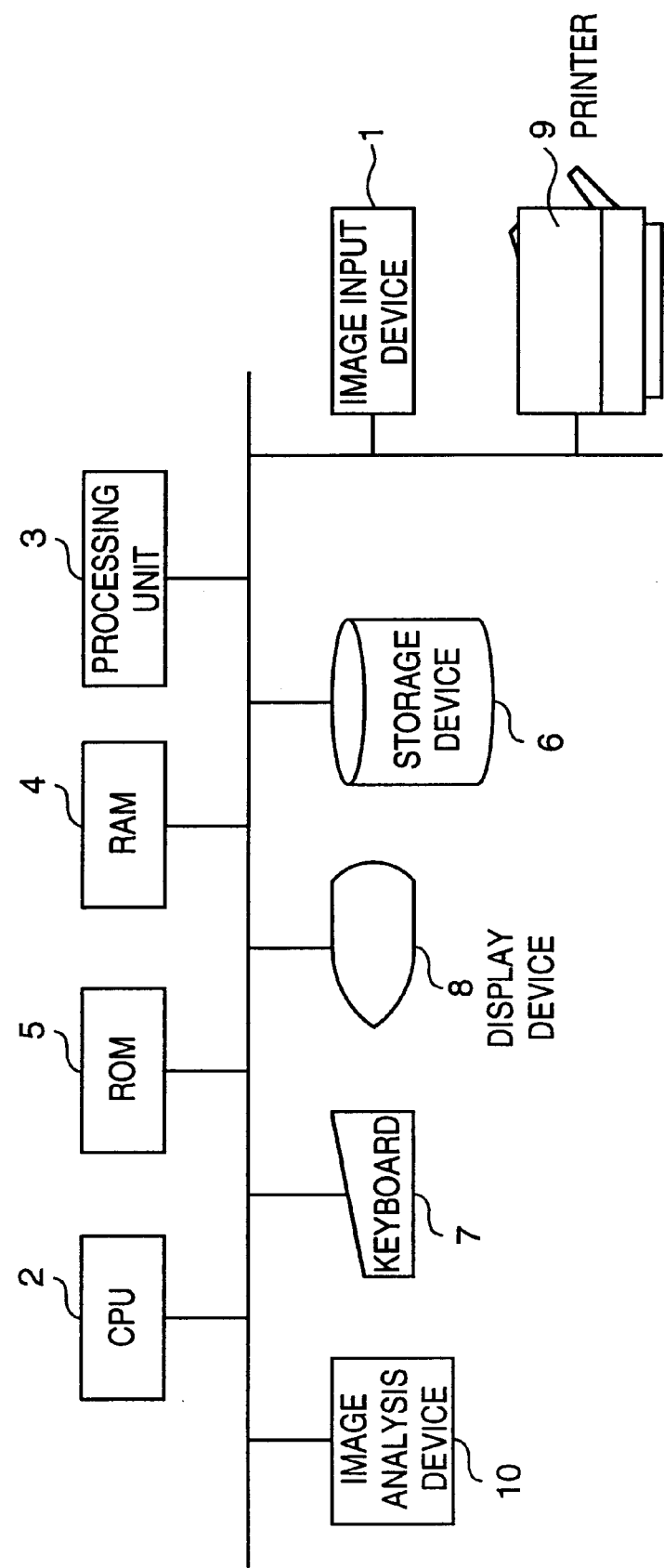
FIG. 1 is a block diagram showing the schematic arrangement of a system according to the first embodiment of the present invention.

FIG. 1 is a block diagram showing an image editing system according to the first embodiment of the present invention.

Reference numeral 1 denotes an image input device such as a film scanner or digital camera, which is used to input the images to be laid out to the system. In addition, when, for example, a photographing device such as an advanced photo system camera or digital camera is to be used, the image input device 1 is used to input pieces of accompanying information such as information about the date of photography, photographic exposure information, and caption information, which are recorded in a photographing operation. Note that the caption information is the title information constituted by characters, numbers, simple graphic patterns, and the like and selected by the photographer from various event names registered in the photographing device in advance to be printed on a photographic print.

Reference numeral 2 denotes a CPU for controlling various devices (to be described later) and executing programs; 3, a processing unit, which is a hardware device dedicated to special processing to support part of the processing to be executed by the CPU; 4, a RAM which is used as a work area for the processing to be performed by the CPU 2 and temporarily saves data and the like; 5, a ROM storing control programs and the like for the CPU 2; and 6, an external storage device in which the images input from the image input device 1 are accumulated and layout templates, background images, an the like which are prepared in advance are stored.

Reference numeral 7 denotes a keyboard which is used by the operator to input various commands; 8, a display device for displaying the images input from an image input means, layout results, and the like; and 9, a printer for printing a finished sheet image on a cardboard.

Note that the above arrangement can be implemented by a general personal computer and the like as well as dedicated hardware.

Figure 2:
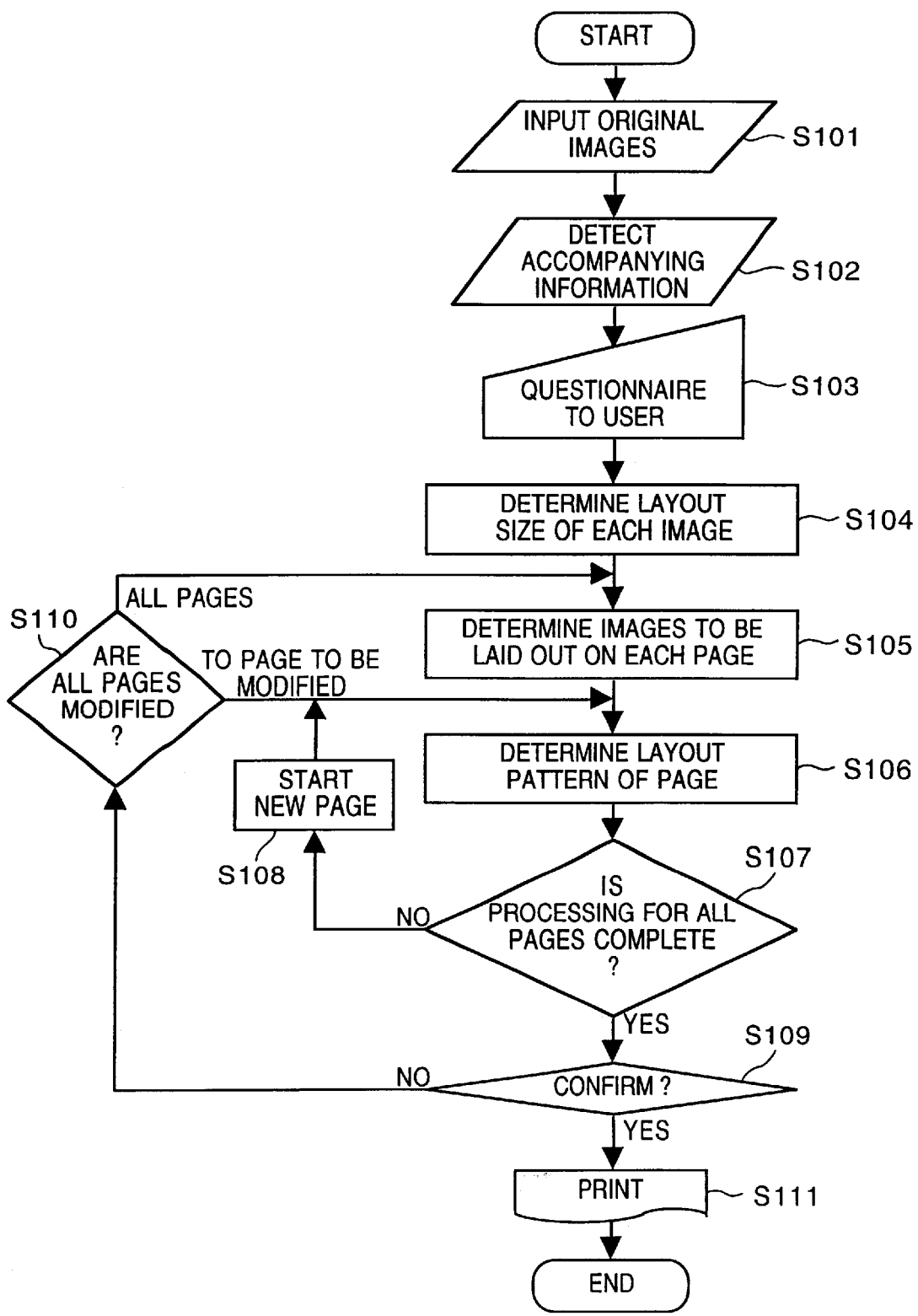
FIG. 2 is a flow chart showing the operation of the first embodiment.

FIG. 2 is a flow chart showing the flow of processing in this system.

In step S101, original images are input from the image input device 1 such as an advanced photo system camera, a digital camera, or a film scanner. The input original images are stored in the external storage device 6.

In step S102, pieces of accompanying information such as the total number of original images, the size, and the resolution are detected. When an advanced photo system camera or digital camera is used as an image input means, pieces of accompanying information indicating the lens used in photography and indicating whether an electronic flash was used are detected, in addition to pieces of accompanying information corresponding to each pixel, e.g., photographic date information, exposure information, and caption information.

In step S103, a questionnaire is given to the user. For example, the user is inquired whether the respective images preferably have the same layout size within a page. The user then inputs answers to such inquiries. In addition, the user is inquired about his/her preferences in composition, color, and the like.

In step S105, the user is caused to select a criterion for determining a new page start position, i.e., a photographic date change point, a caption information change point, or the like, in assigning images to the respective pages.

In step S104, the layout size of each image is determined. In this case, the layout size is determined on the basis of information about resolution or the like of the accompanying information detected in step S102.

In step S105, the images to be laid out on each page are determined in accordance with the attributes of the respective images. In other words, new page start positions are determined. In this case, date change points or the like at which the images can be properly delimited are determined as new page start positions in accordance with the above accompanying information such as photographic date information as the attributes. If no photographic date information is available, new page start positions may be determined by determining event delimitations on the basis of the above caption information, or by determining, on the basis of the exposure information or the information indicating the use/nonuse of an electronic flash, whether the corresponding image was photographed indoors or outdoors. Note that a criterion for determining these new page start positions is determined in accordance with the commands input by the user in answering the questionnaire in step S103. A plurality of images are laid out on one page. Obviously, the number of images corresponds to the layout size of each image.

The order of assignment of images to each page need not comply with the order of photography. When, for example, the images are to be assigned to the respective pages in accordance with pieces of caption information, images with identical pieces of caption information may be assigned to the same page regardless of the order of photography.

In step S106, the operator is caused to designate a template for each page so as to determine a layout pattern. That is, of the templates of different patterns prepared in the external storage device 6, a template corresponding to the layout size of each image determined in step S104 and the number of images to be laid out within the sheet, which is determined in step S105, is determined. As the background image to be included in the template, a background image with a sense of the season is automatically set in accordance with, for example, the photographic date information. If no photographic date is available, an optimal background image may be automatically selected in accordance with the caption information, e.g., the contents of an event such as a birthday or Christmas. Alternatively, a background image may be automatically selected in accordance with the information about the operator's preference in color or the like input in step S103.

In step S107, it is checked whether processing for all the pages is complete. A new page is then started (step S108), and step S106 is repeated until layout templates are determined for all the pages.

In step S109, the user checks the layout pattern of the page which has been laid out, and determines whether to confirm it. If NO in step S109, the flow advances to step S110 to input information indicating whether to modify all the pages. If it is determined that all the pages are to be modified, the flow advances to step S105. If it is determined that some pages are to be modified, the flow returns to step S106 to determine a template for the designated page again. If YES in step S109, the printer 9 outputs the sheet image on a cardboard in step S111. The processing is then terminated.

(Second Embodiment)

The first embodiment has exemplified the method of using the accompanying information recorded as the attributes of each image in an advanced photo system camera or digital camera. If such accompanying information cannot be obtained from an image input means 1 or designated by the user, new page start positions are determined on the basis of the analysis result obtained by an image analysis device 10. In step S102, the image analysis device 10 performs more advanced image analysis such as composition pattern classification based on the image data of each image by using the hue, lightness, and chroma of each image, edge extraction, and the like, thereby estimating each scene or event change point. In step S105, new page start positions at which the respective changes can be properly delimited are determined.

In another method, in which a film scanner is used as the image input device 1, a prescanning operation is performed with a low resolution before the original image input operation in step S101, and the image analysis device 10 analyzes the respective images on the basis of the prescanned images.

As is obvious, even when the above information can be obtained from the image input means 1, layouts can be further optimized by using the analysis result obtained by the image analysis device 10.

As described above, there is provided an image editing apparatus for laying out a plurality of images input from an image input means throughout a plurality of pages, including a determination means for automatically determining the images to be laid out on each page in accordance with the attributes of the respective images, and a means for laying out the respective images determined by the determination result. This saves the time and effort spent to set various parameters for each page, and provides a variety of layouts. In addition, the images to be laid out on each page can be automatically and properly set.

(Third Embodiment)

A technique of further optimizing layouts will be described as the third embodiment of the present invention. Note that the hardware arrangement of this embodiment is almost the same as that of the above embodiment described with reference to FIG. 1.

Figure 3:
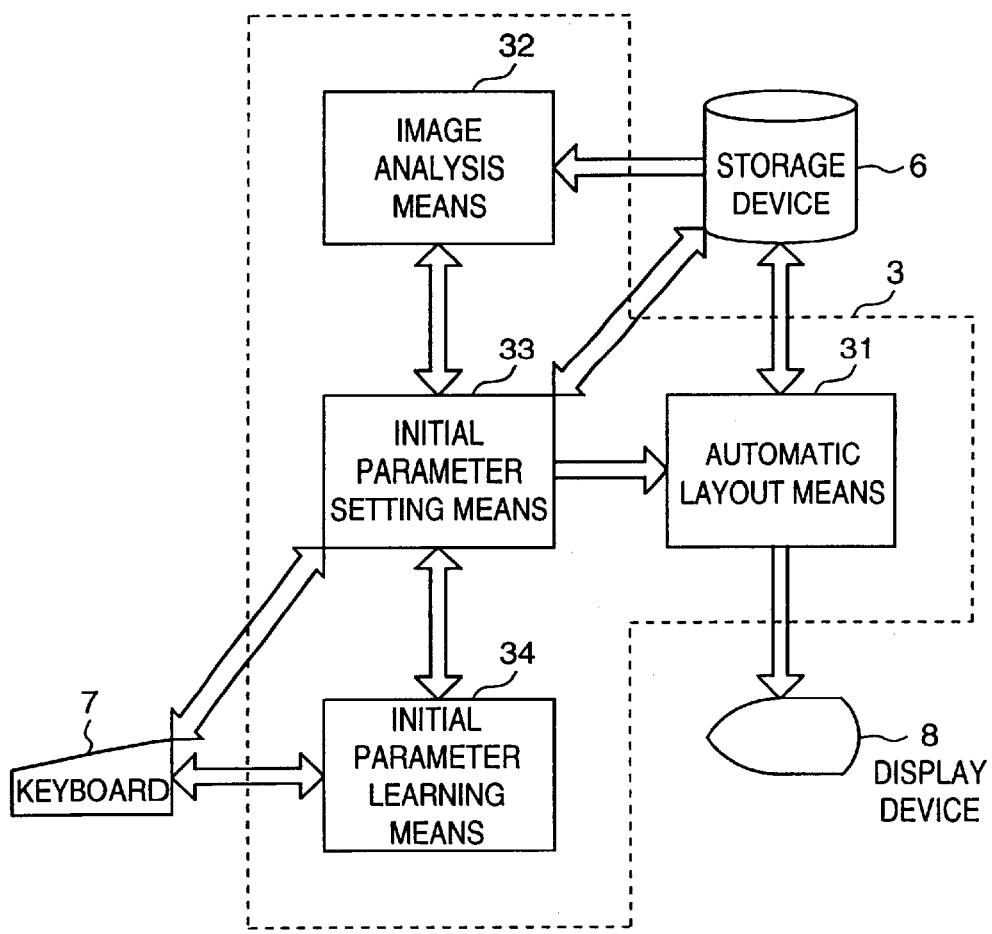
FIG. 3 is a block diagram showing a processing unit and its peripheral devices in the third embodiment of the present invention.

FIG. 3 is a block diagram showing the detailed arrangement of a processing unit 3 in this embodiment. Referring to FIG. 3, reference numeral 31 denotes an automatic layout means for finely adjusting layout positions, sizes, and the like to obtain an intuitively beautiful layout upon reception of initial parameters such as the approximate layout positions of the images to be laid out on one page, the size of each image, and a background image from an initial parameter setting means 33; 32, an image analysis means for detecting pieces of information, e.g., the total number of images, the size information of each image, resolution information, photographic date information, photographic exposure information, and caption information, which are stored in a external storage device 6, and performing advanced information analysis such as composition pattern classification based on the image data of each image by using the hue, lightness, and chroma of each image, edge extraction, and the like; and, 34, an initial parameter learning means for learning the initial parameters obtained from the layout result finally confirmed by the user in the processing to be described later, thereby allowing the initial parameter setting means 33 to supply optimal initial parameters reflecting the user's preferences.

The flow of control in this embodiment will be described next with reference to FIG. 4. FIGS. 5A to 5G are views for explaining detailed examples of how images are edited. Note that the control programs in this embodiment are also stored in a RAM 4 as in the first embodiment.

Figure 5A:
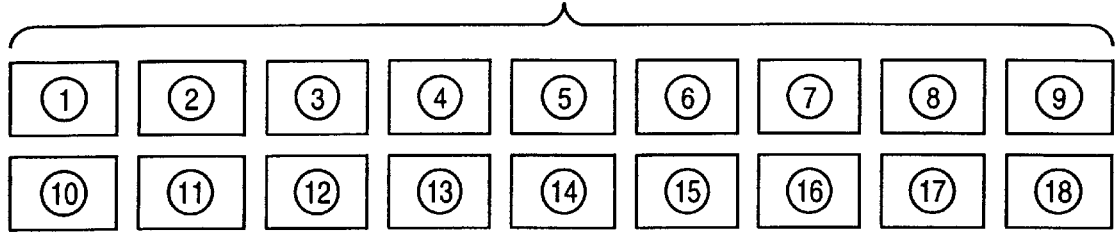
FIG. 5A is a view for explaining input images in the third embodiment.
Figure 5B:
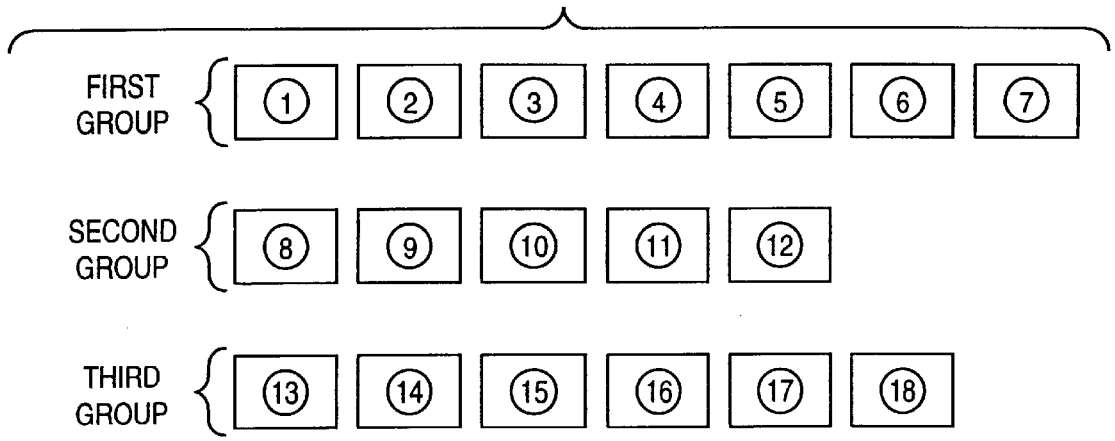
FIG. 5B is a view for explaining a grouping operation in the third embodiment.

In step S201 in FIG. 4, a plurality of images are input from an image input device 1. The input images are stored in the external storage device 6. For example, 18 images are input, as shown in FIG. 5A. In this case, pieces of accompanying information of each image, e.g., photographic date information, exposure information, size information, resolution information, and caption information, are input together with each image.

In step S202, the initial parameter setting means 33 in the processing unit 3 analyzes each image stored in the external storage device 6. In this step, the accompanying information input together with each image is detected.

Figure 6A:
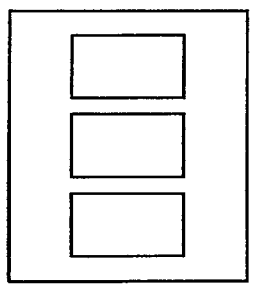
FIGS. 6A and 6B are views for explaining layout patterns.
Figure 6B:
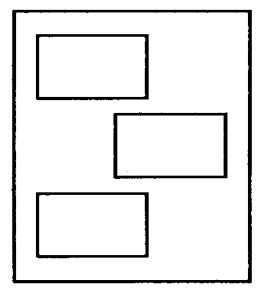

In step S203, a questionnaire is given to the user to cause the user to input the following pieces of information to the initial parameter setting means 33 by using the keyboard 7: (1) the degree of importance of each image; (2) a criterion for determining the assignment of the images to the respective pages, e.g., photographic date information or the degree of importance of each image; (3) the approximate number of images to be laid out per page; (4) the approximate layout position of each image; (5) a favorite color; and the like. For example, as (4) the layout position of each image, the user inputs information indicating his/her preference for a layout pattern, i.e., a neat layout like the one shown in FIG. 6A or an untidy layout like the one shown in FIG. 6B, in laying out three images on one page.

In step S204, the initial parameter setting means 33 classifies all the images input in step S201 into a plurality of groups. Assume that the user has designated the execution of assignment of the images to the respective pages on the basis of the photographic date information in response to question (2) in step S203. In this case, the initial parameter setting means 33 determines the photographic date information on the basis of the image analysis result obtained in step S202, and groups the images on the basis of the photographic date information. If the user has designated the execution of assignment of the images on the basis of the degree of importance of each image, for example, images with high degrees of importance may be classified into a single group or formed into different groups. Alternatively, the images may be grouped in accordance with the analysis results obtained by the image analysis means 32 as well as the photographic exposure information or the caption information. If, for example, 18 images are classified into three groups, as shown in FIG. 5A, in step S201, the first to seventh images are formed into the first group; the eighth to 12th images, the second group; and the 13th to 18th images, the third group.

Figure 5C:
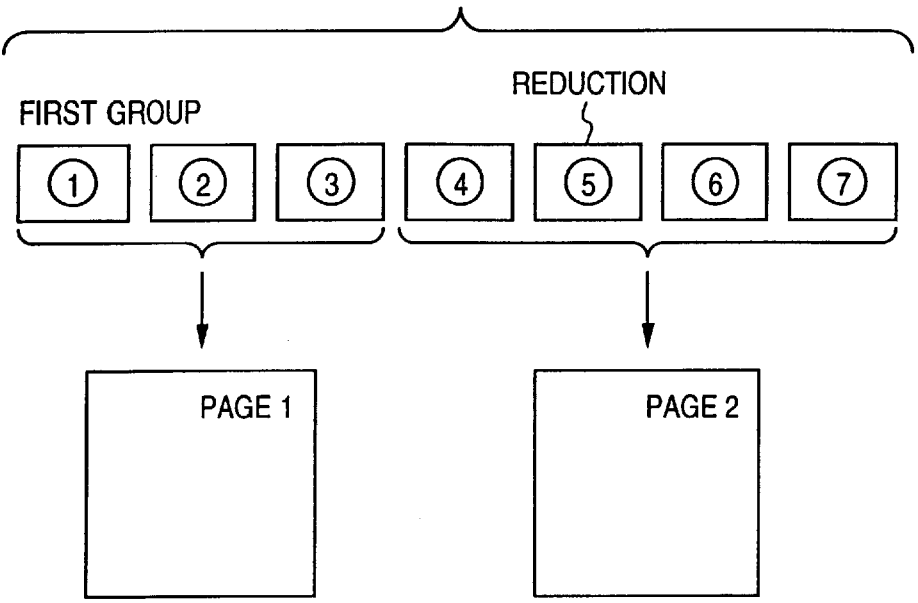
FIG. 5C is a view for explaining the assignment of images to the respective pages in the first group in the third embodiment.

In step S205, the initial parameter setting means 33 determines the images, of the images belonging to each group, which are to be laid out on each page. Assume that the user has designated the assignment of three images to each page in response to question (3) in step S203. In this case, if, for example, the seven images formed into the first group are sequentially laid out, from the first image, three images at a time for each page, three images are laid out on each of the first and second pages, whereas one image (the seventh image) is laid out on the third page. When, however, only one image is laid out on the third page, the resultant layout is poor in balance with an excessive blank space. For this reason, it is determined that three images are assigned to the first page, and four images are assigned to the second page. This operation can be realized by reducing the image designated as an image with a low degree of importance by the user, as needed. For example, as shown in FIG. 5C, the fifth image designated as an image with a low degree of importance by the user is reduced, and the number of images to be laid out on each page is determined such that three images are laid out on the first page, and four images are laid out on the second page. With this operation, the images can be proportionally assigned to the respective pages by preventing any excessive blank space. Note that image reduction processing need not be performed in this step. If the size information attached to the image is changed, the image is output in a reduced form in display processing or print processing afterward.

Figure 5D:
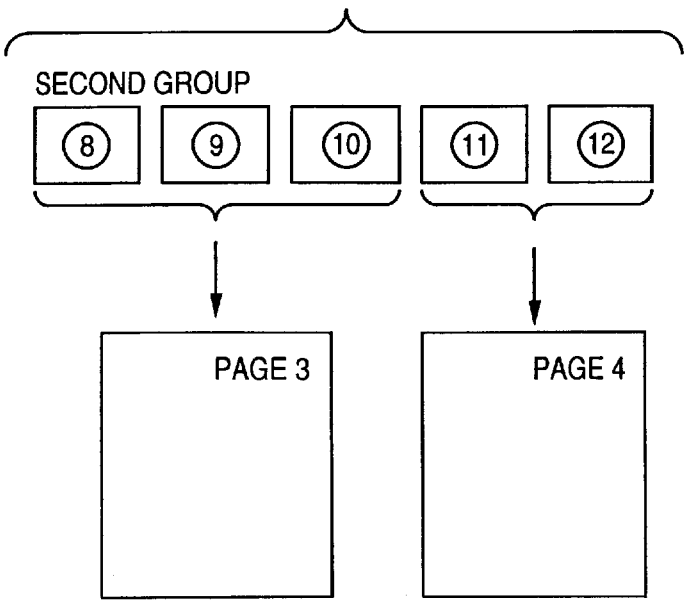
FIG. 5D is a view for explaining the assignment of images to the respective pages in the second group in the third embodiment.
Figure 5E:
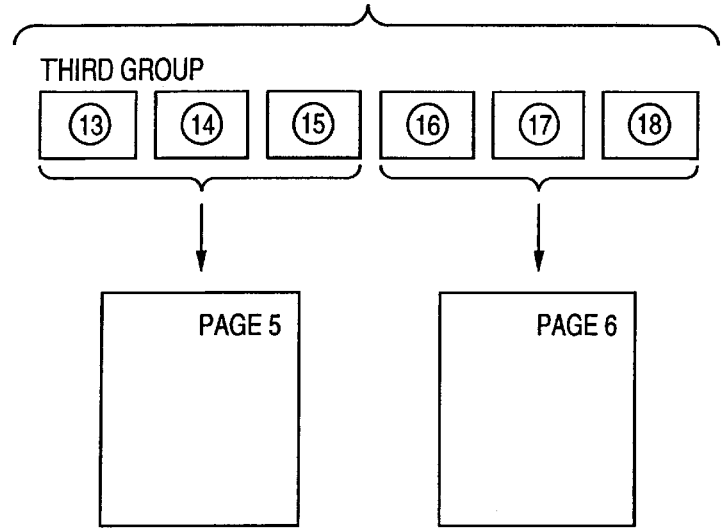
FIG. 5E is a view for explaining the assignment of images to the respective pages in the third group in the third embodiment.
Figure 5F:
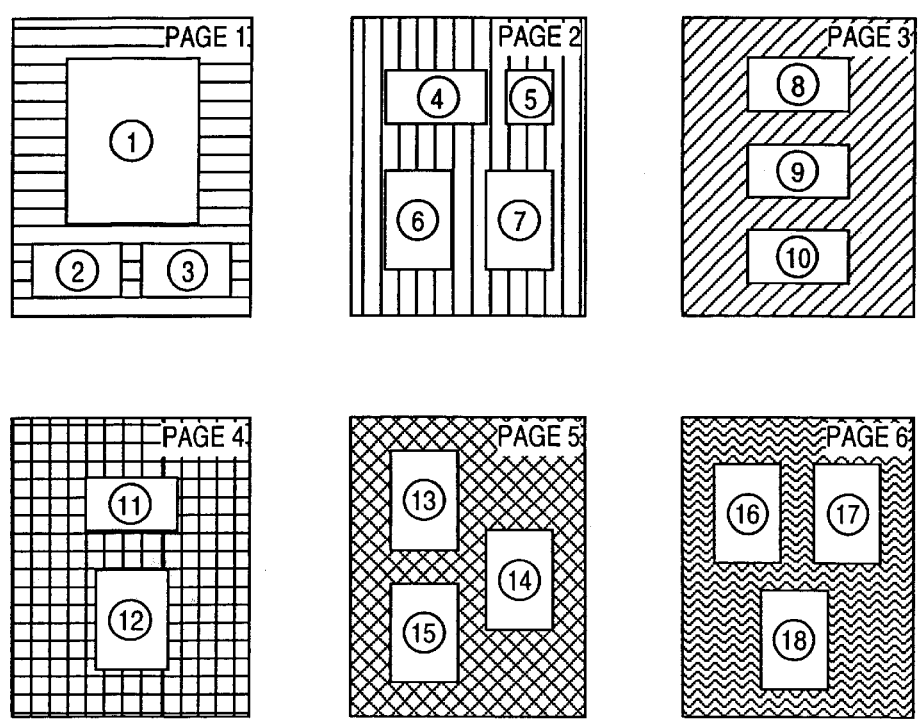
FIG. 5F is a view for explaining the layout results of all pages in the third embodiment.
Figure 5G:
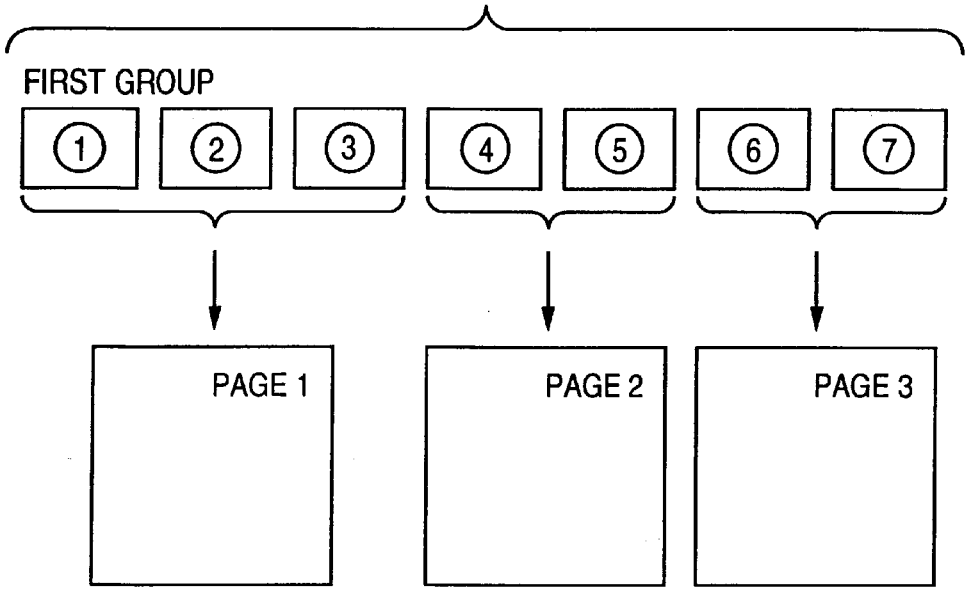
FIG. 5G is a view for explaining another example of the assignment of images to the respective pages in the first group in the third embodiment.

Alternatively, when seven images are to be laid out on three pages, three images may be laid out on the first page, and two images may be laid out on each of the second and third pages, as shown in FIG. 5G. In this manner, these images may be proportionally assigned to the respective pages. In either case, images classified into difference groups are not laid out on the same page.

In this manner, the images in the second and third groups are also assigned to pages, as shown in FIGS. 5D and 5E, as in the first group.

As described above, in step S205, the number of images to be laid out on each page is determined in accordance with the number of images belonging to each group. More specifically, this processing is performed by determining the number of images to be laid out on each page in accordance with the number of images belonging to the corresponding group. Note that some image is reduced, as needed.

In step S206, the initial parameter setting means 33 sets the initial parameters required for automatic layout processing for each page. More specifically, the initial parameter setting means 33 sets the approximate layout position of each image on one page, which has been designated in response to question (4) in step S203, and a background image corresponding to the favorite color input in response to question (5) in step S203 as initial parameters. As the background image, an image with a sense of the season is set in accordance with the photographic date information input together with the images. In addition, if caption information is input, a background is set on the basis of this information.

Assume that random parameters are supplied for the processing in steps S204 to S206 on the basis of the questionnaire result obtained in step S203, the analysis result obtained by the initial parameter setting means 33, the information obtained by the initial parameter learning means 34, and random numbers.

In step S207, the automatic layout means 31 executes automatic layout processing on the basis of the initial parameters set in the above manner. As a result, the layout positions, sizes, and the like are attractively adjusted, and the layout result on the corresponding page is obtained.

In step S208, it is checked whether automatic layout processing for all the pages is complete. If NO in step S208, a new page is started in step S209, and the flow returns to step S207. With this operation, automatic layout processing is executed for all the pages, and the layout result on all the pages can be obtained, as shown in FIG. 5F.

The layout result on all the pages having undergone automatic layout processing in this manner is displayed on a display device 8 in step S210. In step S211, the user is caused to input information indicating whether to confirm the layout result on all the pages with a keyboard 7.

If the user does not confirm the result, i.e., designates the execution of modification, in step S211, the user is caused in step S212 to input information indicating whether to modify all pages or one page. If the modification of one page is designated in step S212, the flow returns to step S206 to set initial parameters for the corresponding page again so as to execute the automatic layout processing in step S207 again. If the modification of all pages is designated in step S212, the flow returns to step S205 to start the above processing again from assignment of the images belonging to the respective groups to the respective pages. Note that since random number elements are used in the processing in steps 205 and 206, parameters different from the previous parameters are set when the above processing is to be executed again.

When a satisfactory layout result is obtained in this manner, and the user confirms the layout result in step S211, the confirmed layout parameters are stored in the external storage device 6. In addition, the initial parameter learning means 34 learns the initial parameters for the confirmed layout result. In subsequent layout processing, the initial parameters input from the initial parameter setting means 33 to the automatic layout means 31 will reflect the user's preferences. Note that the initial parameter learning means 34 preferably learns the initial parameters for the layout result which has not been confirmed as well as the initial parameters for the confirmed layout result. The layout result determined upon confirmation of the layout parameters is printed by a printer 9 in step S213.

(Fourth Embodiment)

In the fourth embodiment, the confirmation processing in step S211 in the third embodiment is set after automatic layout processing for each page, i.e., step S207. More specifically, every time automatic layout processing for each page is executed, the user inputs information indicating whether to confirm the resultant layout. With this operation, the initial parameters are learnt in the process of forming an album, parameters corresponding to the user's preferences can be set with a small number of times of execution of layout processing. As a result, the time required for editing can be shortened.

(Fifth Embodiment)

In the above embodiment, a plurality of images are classified into groups, and the images in the respective groups are assigned to the respective pages. This prevents images classified into different groups from being assigned to the same page, and proportionally assigns the images. Obviously, it suffices if a plurality of input images are assigned to pages in accordance with the total number of images without grouping the images.

As described above, according to the third to fifth embodiments, when a plurality of images input from the image input means are to be laid out on a plurality of pages, the number of images to be laid out on one page is input, and the images are assigned to the respective pages in accordance with the number of images. With this operation, images can be laid out on a plurality of pages without disproportionally assigning the images, thereby obtaining a well-balanced layout.

In this case, images classified into different groups can be prevented from being assigned to the same page by classifying all images into a plurality of groups before assignment of the images to the respective pages, and assigning the images in each group to pages. In addition, since initial parameters for each page are set in accordance with a questionnaire result, the analysis result obtained by the image analysis means, the learning state of the learning means, random numbers, and the like, a layout result reflecting the user's preferences can be obtained.

Although several preferred embodiments of the present invention have been described above, the present invention is by no means limited to these, and various modifications and arrangements may be made without departing from the scope of the following claims.

What is claimed is:

1. An image editing apparatus for laying out a plurality of images input from image input means on a plurality of pages, comprising:

determination means for determining images to be laid out on each page;

layout means for automatically determining layout patterns of the images in each page in accordance with the determination made by said determination means, based on initial parameters for determining layout patterns;

modification means for manually modifying the layout patterns in each page determined by said layout means;

learning means for learning the layout patterns based on the modification by said modification means; and setting means for setting the initial parameters of said layout means to perform layout of a next page with reference to the learning by said learning means.

2. The apparatus according to claim 1, wherein said determination means sets the number of images to be laid out on each page in accordance with the number input from said input means and the number of the plurality of images, and determines images to be laid out on each page on the basis of the set number of images for each page.

3. The apparatus according to claim 1, wherein one of the plurality of images is reduced, as needed.

4. The apparatus according to claim 1, wherein said determination means determines images to be laid out on each page on the basis of attribute information attached to each of the images.

5. The apparatus according to claim 4, wherein the attribute information is photographic date information.

6. The apparatus according to claim 4, wherein the attribute information is caption information.

7. The apparatus according to claim 1, further comprising analysis means for analyzing the images, and wherein said determination means determines images to be laid out on each page on the basis of the analysis result on each of the images.

8. The apparatus according to claim 7, wherein said analysis means analyzes a hue of each of the images.

9. The apparatus according to claim 7, wherein said analysis means analyzes a lightness of each of the images.

10. The apparatus according to claim 7, wherein said analysis means analyzes a chroma of each of the images.

11. The apparatus according to claim 7, wherein said analysis means analyzes an edge of each of the images.

12. The apparatus according to claim 1, further comprising parameter setting means for inputting parameters for each page to said layout means.

13. An image editing apparatus for laying out a plurality of images input from image input means on a plurality of pages, comprising:

input means for inputting a number of images to be laid out on one page;

grouping means for classifying the plurality of images into groups;

determination means for determining images to be laid out on each page in accordance with the number input from said input means and a number of images in each of the groups;

layout means for automatically determining layout patterns of the images in each page in accordance with the determination made by said determination means, based on initial parameters for determining layout patterns;

modification means for manually modifying the layout patterns in each page determined by said layout means;

learning means for learning the layout patterns based on the modification by said means; and wherein setting means for setting the initial parameters of said layout means to perform layout of a next page with reference to the learning by said learning means.

14. The apparatus according to claim 13, wherein said determination means sets the number of images to be laid out on each page in accordance with the number input from said input means and the number of images in each of the groups, and determines images to be laid out on each page on the basis of the set number of images for each page.

15. The apparatus according to claim 13, wherein one of the plurality of images is reduced, as needed.

16. The apparatus according to claim 13, wherein said determination means determines images to be laid out on each page on the basis of attribute information attached to each of the images.

17. The apparatus according to claim 16, wherein the attribute information is photographic date information.

18. The apparatus according to claim 16, wherein the attribute information is caption information.

19. The apparatus according to claim 13, further comprising analysis means for analyzing the images, and wherein said determination means determines images to be laid out on each page on the basis of the analysis result on each of the images.

20. The apparatus according to claim 19, wherein said analysis means analyzes a hue of each of the images.

21. The apparatus according to claim 19, wherein said analysis means analyzes a lightness of each of the images.

22. The apparatus according to claim 19, wherein said analysis means analyzes a chroma of each of the images.

23. The apparatus according to claim 19, wherein said analysis means analyzes an edge of each of the images.

24. The apparatus according to claim 13, further comprising parameter setting means for inputting parameters for each page to said layout means.

25. An image editing method of laying out a plurality of images input from image input means on a plurality of pages, comprising the steps of:

determining images to be laid out on each page;

automatically determining layout patterns of the images in each page in accordance with the determination made at said determining step, based on initial parameters for determining layout patterns;

manually modifying the layout patterns determined in each page;

learning the layout patterns based on the modification; and setting the initial parameters to perform layout of a next page with reference to the learning.

26. The method according to claim 25, wherein said determination step sets the number of images to be laid out on each page in accordance with the number input in said input step and the number of the plurality of images, and determines images to be laid out on each page on the basis of the set number of images for each page.

27. The method according to claim 25, wherein one of the plurality of images is reduced, as needed.

28. The method according to claim 25, wherein said determination step determines images to be laid out on each page on the basis of attribute information attached to each of the images.

29. The method according to claim 28, wherein the attribute information is photographic date information.

30. The method according to claim 28, wherein the attribute information is caption information.

31. The method according to claim 25, further comprising an analysis step of analyzing the images, and wherein said determination step determines images to be laid out on each page on the basis of the analysis result on each of the images.

32. The method according to claim 31, wherein said analysis step analyzes a hue of each of the images.

33. The method according to claim 31, wherein said analysis step analyzes a lightness of each of the images.

34. The method according to claim 31, wherein said analysis step analyzes a chroma of each of the images.

35. The method according to claim 31, wherein said analysis step analyzes an edge of each of the images.

36. The method according to claim 25, further comprising a parameter setting step of inputting parameters for each page to said layout step.

37. An image editing method of laying out a plurality of images input from image input means on a plurality of pages, comprising the steps of:

inputting a number of images to be laid out on one page;

classifying the plurality of images into groups;

determining images to be laid out on each page in accordance with the number input in said input step and a number of images in each of the groups;

automatically determining layout patterns of the images in each page in accordance with the determination made at said determining step, based on initial parameters for determining layout patterns;

manually modifying the layout patterns determined in each page;

learning the layout patterns based on the modification; and setting the initial parameters to perform layout of a next page with reference to the learning.

38. The method according to claim 37, wherein said determination step sets the number of images to be laid out on each page in accordance with the number input in said input step and the number of images in each of the groups, and determines images to be laid out on each page on the basis of the set number of images for each page.

39. The method according to claim 37, wherein one of the plurality of images is reduced, as needed.

40. The method according to claim 37, wherein said determination step determines images to be laid out on each page on the basis of attribute information attached to each of the images.

41. The method according to claim 40, wherein the attribute information is photographic date information.

42. The method according to claim 40, wherein the attribute information is caption information.

43. The method according to claim 37, further comprising an analysis step of analyzing the images, and wherein said determination step determines images to be laid out on each page on the basis of the analysis result on each of the images.

44. The method according to claim 43, wherein said analysis step analyzes a hue of each of the images.

45. The method according to claim 43, wherein said analysis step analyzes a lightness of each of the images.

46. The method according to claim 43, wherein said analysis step analyzes a chroma of each of the images.

47. The method according to claim 43, wherein said analysis step analyzes an edge of each of the images.

48. The method according to claim 37, further comprising a parameter setting step of inputting parameters for each page to said layout step.

49. A medium storing a program for causing a computer to lay out a plurality of images input by an image input function on a plurality of pages, wherein said computer is caused to realize:

a determination function of determining images to be laid out on each page;

a layout function of automatically determining layout patterns of the images in each page in accordance with the determination made at said determination function, based on initial parameters for determining layout patterns;

a modification function of manually modifying the layout patterns determined in each page;

a learning function of learning the layout patterns based on the modification; and a setting function of setting the initial parameters to perform layout of a next page with reference to the learning.

50. The medium according to claim 49, wherein said determination function sets the number of images to be laid out on each page in accordance with the number input by said input function and the number of the plurality of images, and determines images to be laid out on each page on the basis of the set number of images for each page.

51. The medium according to claim 49, wherein one of the plurality of images is reduced, as needed.

52. The medium according to claim 49, wherein said determination function determines images to be laid out on each page on the basis of attribute information attached to each of the images.

53. The medium according to claim 52, wherein the attribute information is photographic date information.

54. The medium according to claim 52, wherein the attribute information is caption information.

55. The medium according to claim 49, wherein said computer is caused to realize an analysis function of analyzing the images, and wherein said determination function determines images to be laid out on each page on the basis of the analysis result on each of the images.

56. The medium according to claim 55, wherein said analysis function analyzes a hue of each of the images.

57. The medium according to claim 55, wherein said analysis function analyzes a lightness of each of the images.

58. The medium according to claim 55, wherein said analysis function analyzes a chroma of each of the images.

59. The medium according to claim 55, wherein said analysis function analyzes an edge of each of the images.

60. The medium according to claim 49, wherein said computer is caused to realize a parameter setting function of inputting parameters for each page to said layout function.

61. A medium storing a program for causing a computer to lay out a plurality of images input from an image input function on a plurality of pages, wherein said computer is caused to realize:

an input function of inputting a number of images to be laid out on one page;

a grouping function of classifying the plurality of images into groups;

a determination function of determining images to be laid out on each page in accordance with the number input by said input function and a number of images in each of the groups;

a layout function of automatically determining layout patterns of the images in each page in accordance with the determination made at said determination function, based on initial parameters for determining layout patterns;

a modification function of manually modifying the layout patterns determined in each page;

a learning function of learning the layout patterns based on the modification; and a setting function of setting the initial parameters to perform layout of a next page with reference to the learning.

62. The medium according to claim 61, wherein said determination function sets the number of images to be laid out on each page in accordance with the number input by said input function and the number of images in each of the groups, and determines images to be laid out on each page on the basis of the set number of images for each page.

63. The medium according to claim 61, wherein one of the plurality of images is reduced, as needed.

64. The medium according to claim 61, wherein said determination function determines images to be laid out on each page on the basis of attribute information attached to each of the images.

65. The medium according to claim 64, wherein the attribute information is photographic date information.

66. The medium according to claim 64, wherein the attribute information is caption information.

67. The medium according to claim 61, wherein said computer is caused to realize an analysis function of analyzing the images, and wherein said determination function determines images to be laid out on each page on the basis of the analysis result on each of the images.

68. The medium according to claim 67, wherein said analysis function analyzes a hue of each of the images.

69. The medium according to claim 67, wherein said analysis function analyzes a lightness of each of the images.

70. The medium according to claim 67, wherein said analysis function analyzes a chroma of each of the images.

71. The medium according to claim 67, wherein said analysis function analyzes an edge of each of the images.

72. The medium according to claim 61, wherein said computer is caused to realize a parameter setting function of inputting parameters for each page to said layout function.

73. An image editing apparatus for laying out a plurality of images input from image input means on a plurality of pages, comprising:

determination means for determining images to be laid out on each page in accordance with caption information input by a user upon photographing each of the images;

layout means for automatically determining layout patterns of the images in each page in accordance with the determinating made by said determination means, based on initial parameters for determining layout patterns;

modification means for manually modifying the layout patterns in each page determined by said layout means;

learning means for learning the layout patterns based on the modification by said modification means; and setting means for setting the initial parameters of said layout means to perform layout of a next page with reference to the learning by said learning means.

74. An image editing apparatus for laying out a plurality of images input from image input means on a plurality of pages, comprising:

analysis means for analyzing each of the images;

determination means for determining images to be laid out on each page in accordance with the analysis result obtained by said analysis means;

layout means for automatically determining layout patterns of the images in each page in accordance with the determination made by said determination means, based on initial parameters for determining layout patterns;

modification means for manually modifying the layout patterns in each page determined by said layout means;

learning means for learning the layout patterns based on the modification by said modification means; and setting means for setting the initial parameters of said layout means to perform layout of a next page with reference to the learning by said learning means.

75. The apparatus according to claim 74, wherein said analysis means analyzes a hue of each of the images.

76. The apparatus according to claim 74, wherein said analysis means analyzes a lightness of each of the images.

77. The apparatus according to claim 74, wherein said analysis means analyzes a chroma of each of the images.

78. The apparatus according to claim 74, wherein said analysis means analyzes an edge of each of the images.

79. An image editing method of laying out a plurality of images input from image input means on a plurality of pages, comprising the steps of:

determining images to be laid out on each page in accordance with caption information input by a user upon photographing each of the images;

automatically determining layout patterns of the images in each page in accordance with the determination, based on initial parameters for determining layout patterns;

manually modifying the layout patterns determined in each page;

learning the layout patterns based on the modification; and setting the initial parameters to perform layout of a next page with reference to the learning.

80. An image editing method of laying out a plurality of images input from image input means on a plurality of pages, comprising the steps of:

analyzing each of the images;

determining images to be laid out on each page in accordance with the analysis result obtained in said analysis step;

automatically determining layout patterns of the images in each page in accordance with the determination made at said determining step, based on initial parameters for determining layout patterns;

manually modifying the layout patterns determined in each page;

learning the layout patterns based on the modification; and setting the initial parameters to perform layout of a next page with reference to the learning.

81. The method according to claim 80, wherein said analysis step analyzes a hue of each of the images.

82. The method according to claim 80, wherein said analysis step analyzes a lightness of each of the images.

83. The method according to claim 80, wherein said analysis step analyzes a chroma of each of the images.

84. The method according to claim 80, wherein said analysis step analyzes an edge of each of the images.

85. A medium storing a program for causing a computer to lay out a plurality of images input from an image input function on a plurality of pages, wherein said computer is caused to realize:

a determination function of determining images to be laid out on each page in accordance with caption information input by a user upon photographing each of the images;

a layout function of automatically determining layout patterns of the images in each page in accordance with the determination made at said determination function, based on initial parameters for determining layout patterns;

a modification function of manually modifying the layout patterns determined in each page;

a learning function of learning the layout patterns based on the modification; and a setting function of setting the initial parameters to perform layout of a next page with reference to the learning.

86. A medium storing a program for causing a computer to lay out a plurality of images input from an image input function on a plurality of pages, wherein said computer is caused to realize:

an analysis function of analyzing each of the images;

a determination function of determining images to be laid out on each page in accordance with the analysis result obtained by said analysis function;

a layout function of automatically determining layout patterns of the images in each page in accordance with the determination made at said determination function, based on initial parameters for determining layout patterns;

a modification function of manually modifying the layout patterns determined in each page;

a learning function of learning the layout patterns based on the modification; and a setting function of setting the initial parameters to perform layout of a next page with reference to the learning.

87. The medium according to claim 86, wherein said analysis function analyzes a hue of each of the images.

88. The medium according to claim 86, wherein said analysis function analyzes a lightness of each of the images.

89. The medium according to claim 86, wherein said analysis function analyzes a chroma of each of the images.

90. The medium according to claim 86, wherein said analysis function analyzes an edge of each of the images.

91. The apparatus according to claim 1, wherein the layout patterns are determined by using random numbers.

92. The apparatus according to claim 13, wherein the layout patterns are determined by using random numbers.

93. The method according to claim 25, wherein the layout patterns are determined by using random numbers.

94. The method according to claim 37, wherein the layout patterns are determined by using random numbers.

95. The medium according to claim 49, wherein the layout patterns are determined by using random numbers.

96. The medium according to claim 61, wherein the layout patterns are determined by using random numbers.

97. The apparatus according to claim 73, wherein the layout patterns are determined by using random numbers.

98. The apparatus according to claim 74, wherein the layout patterns are determined by using random numbers.

99. The method according to claim 79, wherein the layout patterns are determined by using random numbers.

100. The method according to claim 80, wherein the layout patterns are determined by using random numbers.

101. The medium according to claim 85, wherein the layout patterns are determined by using random numbers.

102. The medium according to claim 86, wherein the layout patterns are determined by using random numbers.

103. The apparatus according to claim 1, further comprising input means for inputting a number of images to be laid out on one page, wherein said determination means determines images to be laid out on each page in accordance with the number input from said input means and a number of the plurality of images.

104. The method according to claim 25, further comprising an input step of inputting a number of images to be laid out on one page, wherein images to be laid out on each page are determined in accordance with the number input in said input step and a number of the plurality of images.

105. The medium according to claim 49, further comprising an input function of inputting a number of images to be laid out on one page, wherein images to be laid out on each page are determined in accordance with the number input by said input function and a number of the plurality of images.

* * * * *